United States Patent
Oelscher et al.

(12)

(10) Patent No.: US 12,051,185 B2
(45) Date of Patent: *Jul. 30, 2024

(54) METHOD AND APPARATUS FOR THE DETERMINATION OF DEFECTS DURING A SURFACE MODIFICATION METHOD

(71) Applicant: Ford Global Technologies, LLC, Dearborn, MI (US)

(72) Inventors: Michael Herbert Oelscher, Bergheim (DE); Moritz Martinius, Cologne (DE); David Mark Newton, Cologne (DE); Uemit Yigit, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/462,556

(22) Filed: Aug. 31, 2021

(65) Prior Publication Data

US 2022/0067914 A1 Mar. 3, 2022

(30) Foreign Application Priority Data

Aug. 31, 2020 (DE) .......................... 102020210974.5

(51) Int. Cl.
*G06T 7/00* (2017.01)
*B23K 26/03* (2006.01)
(Continued)

(52) U.S. Cl.
CPC .......... *G06T 7/0004* (2013.01); *B23K 26/032* (2013.01); *B23K 31/125* (2013.01);
(Continued)

(58) Field of Classification Search
CPC ......... G06T 7/0004; G06T 2207/20081; G06T 2207/20084; G06T 2207/30152;
(Continued)

(56) References Cited

U.S. PATENT DOCUMENTS

2008/0245778 A1* 10/2008 D'Angelo ............ B23K 26/032
219/121.64
2013/0070078 A1* 3/2013 Takagi .................... G06T 7/001
348/80
(Continued)

FOREIGN PATENT DOCUMENTS

DE 102019212403 2/2021
DE 112010003406 5/2021

*Primary Examiner* — Michael P LaPage
(74) *Attorney, Agent, or Firm* — Burris Law, PLLC

(57) ABSTRACT

A method for determining defects that occur while carrying out a surface modification method of a surface region of a component includes providing an image sequence of a surface region to be assessed. Each image of the image sequence shows an image detail of the surface region and the image details of the individual images overlapping at least partially. The method further includes assigning the individual images to at least two image classes, where at least one image class among the at least two image classes is indicative of a defective image class. The method further includes checking whether a set of individual images of a predeterminable number of directly consecutive individual images in the image sequence have been assigned to the defective image class, and outputting a defect signal.

20 Claims, 7 Drawing Sheets

(51) Int. Cl.
*B23K 31/12* (2006.01)
*G01N 21/88* (2006.01)
*G06F 18/241* (2023.01)
*G06N 3/08* (2023.01)

(52) U.S. Cl.
CPC ....... *G01N 21/8851* (2013.01); *G06F 18/241* (2023.01); *G06N 3/08* (2013.01); *G06T 2207/20081* (2013.01); *G06T 2207/20084* (2013.01); *G06T 2207/30152* (2013.01)

(58) Field of Classification Search
CPC ... B23K 26/032; B23K 31/125; G06F 18/241; G06F 18/214; G06F 18/22; G06N 3/08; G06N 3/045; G01N 21/8851; G01N 2021/8887
See application file for complete search history.

(56) References Cited

U.S. PATENT DOCUMENTS

| | | |
|---|---|---|
| 2013/0178952 A1 | 7/2013 | Wersborg et al. |
| 2015/0001196 A1 | 1/2015 | Kim et al. |
| 2016/0139593 A1 | 5/2016 | Willett et al. |
| 2016/0203596 A1 | 7/2016 | Kodama et al. |
| 2019/0213479 A1* | 7/2019 | Takigawa .................. G06N 5/00 |
| 2020/0175352 A1* | 6/2020 | Cha ........................... G06N 3/04 |
| 2022/0011240 A1* | 1/2022 | Schwarz ................ B23K 26/38 |
| 2022/0238396 A1* | 7/2022 | Mizumura ........... B23K 31/125 |

* cited by examiner

|  |  | Actual values according to visual examination | |
|---|---|---|---|
|  |  | defective | ok |
| Prediction according to proposed method | defective | 100%<br>true positive | 0.0%<br>false positive |
| | ok | 0.0%<br>false negative | *100%<br>true negative |

Fig. 7

METHOD AND APPARATUS FOR THE DETERMINATION OF DEFECTS DURING A SURFACE MODIFICATION METHOD

CROSS-REFERENCE TO RELATED APPLICATIONS

This application claims priority to and the benefit of German Patent Application No. 102020210974.5, filed on Aug. 31, 2020. The disclosure of the above application is incorporated herein by reference.

FIELD

The present disclosure relates to a method and apparatus for the determination of defects during a surface modification method.

BACKGROUND

The statements in this section merely provide background information related to the present disclosure and may not constitute prior art.

Laser-beam hard soldering is a known joining method. In the automobile sector, laser-beam hard soldering is used for example to join zinc-plated steel sheets in the mass production of automobile bodies, for example in order to connect the roof to the side parts or to join together a two-part tailgate outer metal sheet. In this case, a laser beam is guided along the joint while it melts a filler material, for example a copper-silicon wire, which after cooling connects together the components to be joined.

In comparison with other joining methods, laser-beam hard soldering has the advantage that joint connections may be produced with a high strength and at the same time a high esthetic surface quality.

A further known joining method is laser-beam welding, for example for joining lightweight components made of aluminum with the aid of a filler wire.

The aspect of surface quality is of particular importance in these joining methods with a view to customer satisfaction. Quality control of all solder or weld positions is consequently necessary. It is standard practice to carry this out by means of manual visual inspection. Such inspection, however, is very labor-intensive. Efforts are therefore being made to automate the quality assurance method.

Such automated quality assurance methods are known, for example, from the field of laser-beam welding. For instance, DE 11 2010 003 406 T5 discloses a method for determining a welding quality, in which an image of the weld section is acquired with a high-speed camera. The occurrence of parameters, for example the number of welding splatters per unit length, is examined in the acquired image. The welding quality is assessed with the aid of a comparison of the analyzed parameter with a previously compiled comparison table. This method presupposes that suitable meaningful quality parameters can be found. Furthermore, the compilation of a sufficiently accurate comparison table is very elaborate and requires a multiplicity of previously determined datasets, which reflect a relationship between the quality parameter and the actual quality.

A further quality assurance method, which is used for the laser-beam welding of pipes, is known from U.S. Pub. No. 2016/0203596 A1. In this case a camera, with the aid of which images of the joint are acquired, is positioned on the side facing away from the laser, that is to say for example inside the pipe. The number of defects is determined with the aid of image evaluation, which comprises assignment of brightness values to image pixels. This method, however, is only usable for joining methods that allow image recording of the side facing away from the laser, and in which the presence of defects can be deduced by means of the described brightness evaluation. This method is unsuitable for surfaces with extremely high quality because of its inaccuracy.

A higher accuracy may be achieved with the method described in U.S. Pub. No. 2015/0001196 A1, which uses a neural network for the image analysis. An image of a weld seam that has been formed is recorded. Classification of the image, and therefore of the weld seam, as normal or defective may be carried out by means of a neural network, in which case the accuracy of the classification may be varied by means of the properties of the neural network.

SUMMARY

This section provides a general summary of the disclosure and is not a comprehensive disclosure of its full scope or all of its features.

The inventors of the present disclosure likewise attempted to classify images by means of a neural network in order to determine the surface quality of solder seams of an automobile body. To this end, training datasets that characterize an image of the solder seams as defective or not defective were initially generated in a semiautomatic method. It was, however, found that the number of training datasets needed for the required accuracy of the quality assurance method is so great that a very long time or considerable outlay would be required for the generation of suitable training datasets in view of the number of vehicle bodies produced daily and the low proportion of vehicle bodies with defective solder seams.

The inventors of the present disclosure then used an already existing neural network, namely neural network ResNet50, which is a residual convolutional neural network with 50 layers that has been trained with more than one million images and can assign images to more than 1000 categories. The ResNet50 network was then trained further by means of training datasets specific to the soldering method to be assessed. In addition, further machine learning techniques were used in order to improve the accuracy further.

It was found that an accuracy of up to 99.6% can be achieved for the detection of a defect in a single image. In view of the fact that about 2500 individual images are recorded during a single soldering process for connecting an automobile roof to a side part, however, this accuracy is still much too low. In a study of a video of an entire soldering process, a false-negative fraction of 65% was determined, i.e., 65% of the solder positions characterized as defective were not actually defective. Consequently, training datasets would be required in a large scope to train a neural network in such a way that an acceptable accuracy of the classification is obtained. Furthermore, the risk of overfitting limits further improvement of the accuracy.

The present disclosure relates to a computer-implemented method for the determination of defects that occur while carrying out a surface modification method of a surface region of a component. The method comprises providing an image sequence including a plurality of individual images, of a surface region to be assessed, where each individual image shows an image detail of the surface region and the image details of the individual images overlapping at least partially. The method further includes assigning the individual images to at least two image classes, at least one image class of which bears the attribute defective, referred to below as the defective image class, checking whether a set of individual images of a predeterminable number of directly consecutive individual images in the image sequence have been assigned to the defective image class, and, if the set of individual images of the predeterminable number of directly consecutive individual images have been assigned to the defective image class, outputting a defect signal.

Computer-implemented means that at least one method step, provides that several or all method steps, are carried out by using a computer program.

With the method of the present disclosure, surface defects that occur while carrying out the surface modification method in the surface region of the component, for example splatters, holes, cracks, etc. can be determined. Such surface defects may advantageously be determined even during the surface modification method, that is to say in real time, i.e. in situ, so that the corresponding components may be identified rapidly as defective and, for example, reprocessed or rejected.

Besides these surface defects that actually relate to the surface region of the component, it is also possible to determine defects of a surface modification device for carrying out the surface modification method, referred to below as equipment defects. Such equipment defects may detrimentally affect the surface modification method and lead to surface defects. With the aid of the determination of equipment defects, it is therefore possible to avoid surface defects so that the rejection rate may be reduced. Servicing and maintenance measures may be planned and carried out in good time.

Thus, the inventors of the present disclosure have established that defects of optical elements, for example cover or protective glasses, of laser-beam surface modification devices may also be determined by means of the proposed method. Such equipment defects affect the quality of the images recorded or images to be recorded, usually even before the quality of the surface modification method is detrimentally affected and surface defects occur. For example, a defective protective glass may cause blurred images. If a blurred image is then determined in a plurality of individual images (i.e., a set of individual images) of the predeterminable number of directly consecutive individual images, the presence of a protective glass defect may be deduced therefrom.

Further equipment defects that may be determined by means of the proposed method are—depending on the type of surface modification device—for example defective positioning of a soldering wire or welding wire. The same images may advantageously be used for the determination of surface defects and equipment defects, so that defects of both defect types may be determined rapidly and with little outlay.

Because of the computer-implemented variation of the method, fewer personnel are needed for the visual inspection of the components, so that costs may be saved and compliance with quality standards may be achieved reliably since the subjective component can be obviated. Automation of the quality assurance is furthermore made possible. A further advantage of the method is that even very small surface defects, which may possibly not have been identified during a manual visual inspection, for example splatters or pores with a size of only 0.2 mm, may be determined.

The method is suitable for components that may undergo a surface modification method, for example metal, glass, ceramic or plastic components. This also includes components that are obtained by joining individual parts together.

A surface modification method is in this case intended to mean a method that leads to a temporary or permanent modification at least also of the surface of the component, so that an effect of the surface modification method may be assessed with the aid of image recordings of the surface region treated. In one form surface modification methods may be: joining methods such as soldering methods, in particular laser-beam soldering methods, welding methods, in particular laser-beam welding methods, adhesive bonding methods or surface treatment methods such as coating methods, 3D printing methods, plasma treatment methods, cleaning methods, etc.

In a first method step, an image sequence of a surface region to be assessed of the component is provided. For example, the image sequence may be retrieved from a storage medium or transferred directly from a camera that acquires the image sequence. Direct transfer advantageously allows real-time assessment of the occurrence of defects and consequently prompt intervention in the event of the detection of defective components or of a defective surface modification device, so that a high rejection rate may be avoided.

The image sequence comprises a plurality of individual images. Each individual image in this case shows an image detail of the surface region. The image details of the individual images in this case overlap at least partially. This means that an image detail of the individual images is selected in such a way that a surface point of the surface region is imaged in at least two, or more than two, such as in one form, four, directly consecutive individual images. The image detail may in this case have been modified by movement of the component and/or of the camera recording the image sequence.

In a further method step, the individual images are assigned to at least two image classes. At least one of the image classes bears the attribute "defective". This image class is also referred to as the "defective image class". In other words, a plurality of, or in one form, all, the individual images are classified and assigned to an image class, that is to say either to the defective image class or the nondefective image class. Further image classes may optionally be formed, for example according to the type or size of the defect, in order to allow more accurate characterization of a surface defect. For example, discrimination may be carried out according to the type of the defect, for example pore, splatter, etc.

The assignment of the images to the image classes may, for example, be carried out with the aid of a classification model or a regression model. According to the Enzyklopädie der Wirtschaftsinformatik—Online-Lexikon ("Encyclopaedia of Business Informatics—online lexicon"); Editors Norbert Gronau, Jorg Becker, Natalia Kliewer, Jan Marco Leimeister, Sven Overhage, a classification model is a mapping that describes the assignment of data objects, in the present case the individual images, to predetermined classes, in the present case the image classes. In this case, the class manifestation of the discrete classification variables is given by the manifestations of the attributes of the data objects. The basis of a classification model is formed by a database, the data objects of which are respectively assigned to a predetermined class. The compiled classification model may then be used for prognosis of the class membership of data objects whose class membership is not yet known.

With a regression model, a dependent continuous variable is explained by a plurality of independent variables. It may therefore likewise be used for prognosis of the unknown value of the dependent variables by the manifestations of the associated independent variables. The difference from a classification model lies in the cardinality of the dependent variables. A classification model involves a discrete variable, and a regression model involves a continuous variable.

After the individual images have been assigned to the image classes, in a further method step a check is made as to whether a plurality of a predeterminable number of directly consecutive individual images have been assigned to the defective image class. In this case, both the number of directly consecutive individual images used and the number of individual images at least assigned to the defective image class may be established according to the specific application case, that is to say for example as a function of the surface modification method used, the measurement technique used, the desired surface quality, etc.

For example, it may be stipulated that it is checked whether all individual images of the predeterminable number of directly consecutive individual images, that is to say for example two individual images of two directly consecutive individual images, have been assigned to the defect class. As an alternative, it may for example be stipulated that it is checked whether two, three or four individual images of four directly consecutive individual images have been assigned to the defect class, etc. In other words, the number of individual images to be checked is less than or equal to the predeterminable or predetermined number of directly consecutive individual images.

In a further method step, a defect signal is output if a plurality of individual images of the predeterminable number of directly consecutive individual images in the image sequence have been assigned to the defective image class. The defect signal may then, for example, be used to bring about an interruption of the surface modification method or the output of advice to an operator of the surface modification device carrying out the surface modification method.

By the occurrence of a surface defect not only being determined with the aid of an individual image classified as defective, but being based on the classification of a plurality of individual images of a predeterminable number of directly consecutive individual images, the accuracy of the defect prediction may be improved significantly. In particular, false-positive and false-negative results, that is to say surface regions falsely assessed as defective or falsely assessed as not defective, may be reduced or even entirely avoided since verification of the assessment of a surface region on the basis of an individual image classified as defective is carried out with the aid of an immediately following individual image.

According to various alternative forms, the method may comprise providing a trained neural network, the assignment of the individual images to the image classes being carried out by means of the trained neural network.

For example, the classification model explained above or the regression model explained above may be implemented in the form of a neural network.

A neural network provides a framework for various algorithms for machine learning, for collaboration, and for the processing of complex data inputs. Such neural networks learn to carry out tasks with the aid of examples, typically without having been programmed with task-specific rules.

A neural network is based on a collection of connected units or nodes, which are referred to as artificial neurons. Each connection can transfer a signal from one artificial neuron to another. An artificial neuron that receives a signal can process it and then activate further artificial neurons connected to it.

In conventional implementations of neural networks, the signal on a connection of artificial neurons is a real number and the output of an artificial neuron is calculated by a nonlinear function of the sum of its inputs. The connections of the artificial neurons typically have a weight that is adapted with progressive learning. The weight increases or decreases the strength of the signal on a connection. Artificial neurons may have a threshold, so that a signal is output only if the total signal exceeds this threshold.

Typically, a multiplicity of artificial neurons are combined in layers. Different layers possibly carry out different types of transformations for their inputs. Signals propagate from the first layer, the input layer, to the last layer, the output layer, possibly after passing through the layers several times.

The architecture of an artificial neural network may correspond to a multilayer perceptron network. A multilayer perceptron network belongs to the family of artificial feed-forward neural networks. Basically, multilayer perceptron networks consist of at least three layers of neurons: an input layer, an intermediate layer, also referred to as a hidden layer, and an output layer. This means that all the neurons of the network are divided into layers, a neuron of one layer always being connected to all the neurons of the next layer. There are no connections to the previous layer and no connections that jump a layer. Apart from the input layer, the various layers consist of neurons that are subject to a nonlinear activation function and are connected to the neurons of the next layer. A deep neural network may have many such intermediate layers.

Training an artificial neural network means suitably adapting the weights of the neurons and optionally threshold values. Basically, distinction is to be made between three different forms of learning: supervised learning, unsupervised learning and reinforcement learning.

In supervised learning, the neural network is presented with very many training datasets, which pass through the neural network. The desired result is in this case known for each training dataset, so that a difference between the actual result and the desired result may be determined. This difference may be expressed as an error function, the minimization of which is the aim of the training. After the end of the training, the trained network is capable of exhibiting the desired reaction even to unknown datasets. Consequently, the trained neural network is capable of performing or generalizing a transfer operation.

In unsupervised learning, on the other hand, no specific desired result is known. Rather, the neural network independently seeks to identify similarities in the datasets and on the basis thereof to compile categories and correspondingly assign further datasets.

As in the case of unsupervised learning, likewise in reinforcement learning no specific desired result is known. There is, however, at least one evaluation function with which an assessment is made as to whether, and optionally to what extent, a result obtained was good or bad. The neural network then tries to increase this function.

The trained neural network used to assign the individual images to the image classes may have been trained by means of one of the methods described above. For example, images of surface regions of a component, for which it is known whether or not they exhibit a defect and which have correspondingly been assigned to the defective image class or nondefective image class, may have been used as training datasets. If further image classes are used, images classified according to these further image classes may have been used as training datasets.

The assignment of the individual images to the image classes by means of the trained neural network has the advantage that the individual images can be assigned with a high accuracy to the respective image class and fewer false-positive or false-negative assignments are consequently obtained. Overall, the accuracy of the prediction of surface defects may therefore be improved further.

In one form, the trained neural network may have been trained by means of transfer learning. Transfer learning uses an already pretrained neural network and teaches it for a special application purpose. In other words, the pretrained neural network has already been trained by means of training datasets and consequently contains the weights and threshold values that represent the features of these training datasets.

The advantage of a pretrained neural network is that learned features can be transferred to other classification fields of endeavor. For example, a neural network that has been trained by means of very many easily available training datasets with bird images may contain learned features, such as edges or horizontal lines, that may be transferred to another classification field of endeavor which, although it does not relate to birds, does relate to images with edges and horizontal lines. In order to obtain a neural network trained suitably for the actual classification field of endeavor, comparatively few further training datasets which relate to the actual classification field of endeavor, that is to say in one form the defect identification described here, are subsequently desired.

Advantageously, only a small number of training datasets specific to the classification field of endeavor are thus needed in order to obtain a suitably trained neural network. The desired specific training datasets may consequently be obtained more rapidly, so that classification is already possible after a short time. Furthermore, it is also possible to solve classification fields of endeavor for which not enough specific training datasets are available in order to be able to train a neural network with exclusively specific training datasets. The use of a pretrained neural network as a starting point for the further training with specific training datasets furthermore has the advantage that less computing power is needed.

The trained neural network may differ from the pretrained neural network for example in that further layers, for example classification layers, have been added.

For example, the neural network mentioned in the introduction under the designation ResNet50 may be used as a pretrained neural network. Besides ResNet50, it is for example also possible to use ResNet18.

In order to further improve the prediction accuracy, it is possible to use methods such as, for example, data augmentation, blurring (Gaussian blur) and other techniques of machine learning. Besides this, the trained neural network may also be trained further with the individual images that have been recorded in the scope of the proposed method.

According to further alternative forms, the trained neural network may have been trained by means of iterative learning.

This means that the neural network may initially be trained with a small training dataset (first iteration loop). With this not yet perfectly trained neural network, first individual images may already be assigned to the defective image class. These may be added to the training dataset, so that the accuracy can be improved in a second iteration loop. Further iteration loops may follow correspondingly.

Advantageously, the accuracy may be increased by means of iterative learning. On the basis of the first iteration loop, the data generation for further training cycles may furthermore be accelerated significantly.

According to further alternative forms, the method may comprise as a further method step, which is carried out before providing the image sequence, recording the image sequence, comprising a plurality of individual images, of the surface region to be assessed, each individual image showing an image detail of the surface region and the image details of the individual images overlapping at least partially.

In other words, the image detail is selected in such a way that a surface point of the surface region is imaged in a plurality of directly consecutive individual images. The recorded images may then be provided in the next method step for the subsequent method steps, so that reference is made to the comments above relating to the image sequence provided.

In one form, the image sequence may be acquired with a frame rate of at least 100 frames per second. Such a frame rate is found advantageous for many surface modification methods, in particular soldering and welding methods, since when fastening the camera for recording the image sequence to the surface modification device, on the one hand a sufficiently large overlap region may be achieved so that potential defects may be identified on a plurality of individual images of the predeterminable number of directly consecutive individual images, in one form, on two or more than two directly consecutive individual images. On the other hand, the frame rate need not be significantly more than 100 frames per second, so that the recording of the images and the real-time evaluation may be carried out with conventional computer technology and therefore economically. A frame rate of less than 100 frames per second may also be sufficient if the forward movement of the processing process is slower and defects can also be imaged in the image sequence with a lower frame rate.

Besides the frame rate, further parameters may also affect the computing power desired, inter alia image resolution (x,y), color information (for example RGB or BW), color depth (for example 8, 10 or 12 bits per channel), assignment of the individual images to the image classes by means of single precision or double precision, etc. Furthermore, the size of the model used, for example of the trained neural network, is crucial for the resources desired on the hardware used.

According to further alternative forms, the image detail may be moved together with a surface modification device for carrying out the surface modification method.

For example, the surface modification method may be a continuous method in which the image detail is displaced with progressive surface modification. It is therefore possible to achieve the effect that the surface region currently being processed is always recorded by the camera, so that newly occurring surface defects can be determined rapidly.

In a laser-beam method, for example a laser-beam soldering method or a laser-beam welding method, it is for example possible to use a camera that is aligned coaxially with the processing laser and consequently looks through the processing laser. The camera therefore moves together with the processing laser. In a laser soldering method, for example the region: part of the soldering wire-process zone-solidified solder connection, which travels together with the processing laser over the surface of the component, may be selected as an image detail.

Such linking of the camera with the surface modification device has the advantage that the camera is moved automatically and therefore the image detail likewise changes automatically, without a separate camera control being needed.

According to further alternative forms, the method may be carried out in real time while carrying out the surface modification method.

This advantageously allows rapid determination of surface defects that occur. Consequently, in the event of a surface defect being determined, it is possible to intervene rapidly so that a defective component can be removed, and further defects may possibly be avoided.

A further aspect of the disclosure relates to an apparatus for the determination of defects that occur while carrying out a surface modification method of a surface region of a component, comprising a data processing unit which is configured and adapted to assign individual images of an image sequence, comprising a plurality of individual images, of a surface region to be assessed, to at least two image classes, each individual image showing an image detail of the surface region and the image details of the individual images overlapping at least partially and at least one image class bearing the attribute defective, referred to below as the defective image class, to check whether a plurality of individual images of a predeterminable number of directly consecutive individual images in the image sequence have been assigned to the defective image class, and, if a plurality of individual images of the predeterminable number of directly consecutive individual images of the image sequence have been assigned to the defective image class, to output a defect signal.

The data processing unit may be in a signal-technological active connection with a memory unit, a camera unit and/or an output unit, and may consequently receive signals of these units and/or transmit signals to these units.

The apparatus may, for example, be used to carry out one of the methods described above, i.e., for the determination of surface defects and/or equipment defects. The advantages of the method according to the disclosure may therefore also be achieved with the apparatus according to the disclosure. All comments relating to the method according to the disclosure may be applied similarly to the apparatus according to the disclosure.

According to various alternative forms, the data processing unit may comprise a trained neural network for assigning the individual images to the at least two image classes. In relation to this, reference is also made to the comments above relating to the description of the trained neural network and its advantages.

According to further alternative forms, the apparatus may comprise a camera unit which is adapted and configured to record an image sequence, comprising a plurality of individual images, of the surface region to be assessed, each individual image showing an image detail of the surface region and the image details of the individual images overlapping at least partially.

In other words, an image detail of the individual images may be selected in such a way that a surface point of the surface region can be imaged in a plurality of directly consecutive individual images.

In one form, the camera may be a high-speed camera having a frame rate of at least 100 frames per second.

According to further alternative forms, the apparatus may comprise a surface modification device configured for the surface modification of the surface region of the component. The surface modification device may for example be a laser soldering device, a laser welding device, an adhesive bonding device, a coating device or a 3D printing device.

In one form, the camera may be mounted directly on the surface modification device so that the camera automatically moves along during movement of the surface modification device or of a part of the surface modification device.

A further aspect of the disclosure relates to a computer program for the determination of defects that occur while carrying out a surface modification method of a surface region of a component, comprising instructions which, when the program is carried out by a computer, cause the latter to assign individual images of an image sequence, comprising a plurality of individual images, of a surface region to be assessed, to at least two image classes, each individual image showing an image detail of the surface region and the image details of the individual images overlapping at least partially and at least one image class bearing the attribute defective, referred to below as the defective image class, to check whether a plurality of individual images of a predeterminable number of directly consecutive individual images in the image sequence have been assigned to the defective image class, and, if a plurality of individual images of the predeterminable number of directly consecutive individual images of the image sequence have been assigned to the defective image class, to output a defect signal.

Consequently, the computer program according to the disclosure may be used to carry out one of the above-described methods according to the disclosure, that is to say for example to determine surface defects and/or equipment defects, when the computer program is run on a computer, a data processing unit or one of the apparatuses specified. The advantages of the method according to the disclosure are therefore also achieved with the computer program according to the disclosure. All comments relating to the method according to the disclosure may be applied similarly to the computer program according to the disclosure.

A computer program may be understood as a program code that can be stored on a suitable medium and/or retrieved via a suitable medium. Any medium suitable for the storage of software, for example a nonvolatile memory installed in a control unit, a DVD, a USB stick, a flashcard or the like, may be used for storing the program code. The retrieval of the program code may, for example, be carried out via the Internet or an intranet or via another suitable wireless or cabled network.

The disclosure furthermore provides a computer-readable data carrier on which the computer program is stored, as well as a data carrier signal which transfers the computer program.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 shows a form of a prediction accuracy, according to the teachings of the present disclosure.

Figure 1:
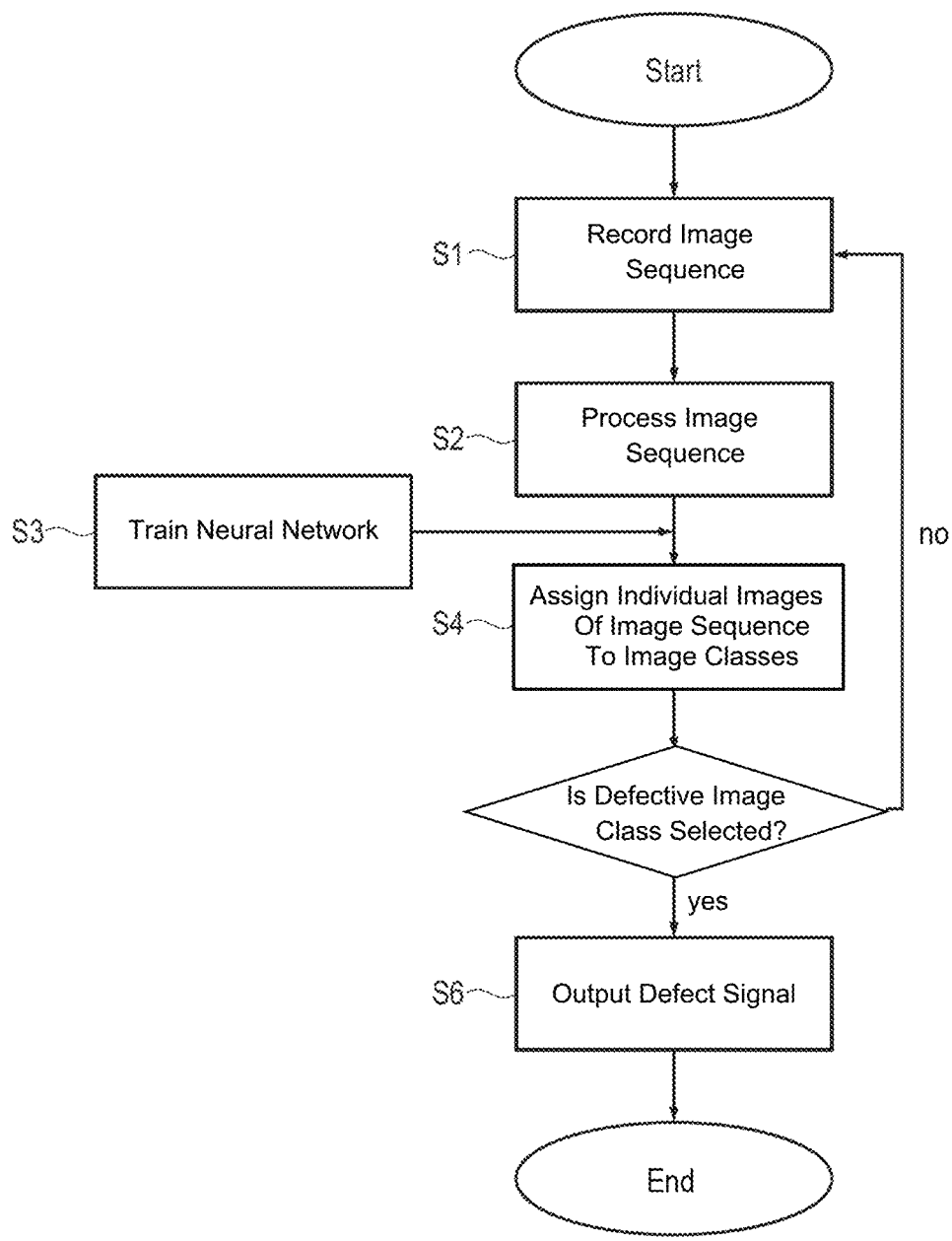
FIG. 1 shows a flowchart of one form of a method, according to the teachings of the present disclosure.

The disclosure will be explained in more detail below with reference to FIGS. 1 and 2 with the aid of a laser soldering method and an associated apparatus 100. A method and an apparatus 100 for the determination of defects 7 that occur while carrying out a laser soldering method of a surface region 8 of a component are therefore described. Specifically, it is laser hard soldering for the connection of metal sheets, namely the connection of a roof of an automobile to the associated side wall. The disclosure is not however restricted to this method and may be used similarly for other surface modification methods.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
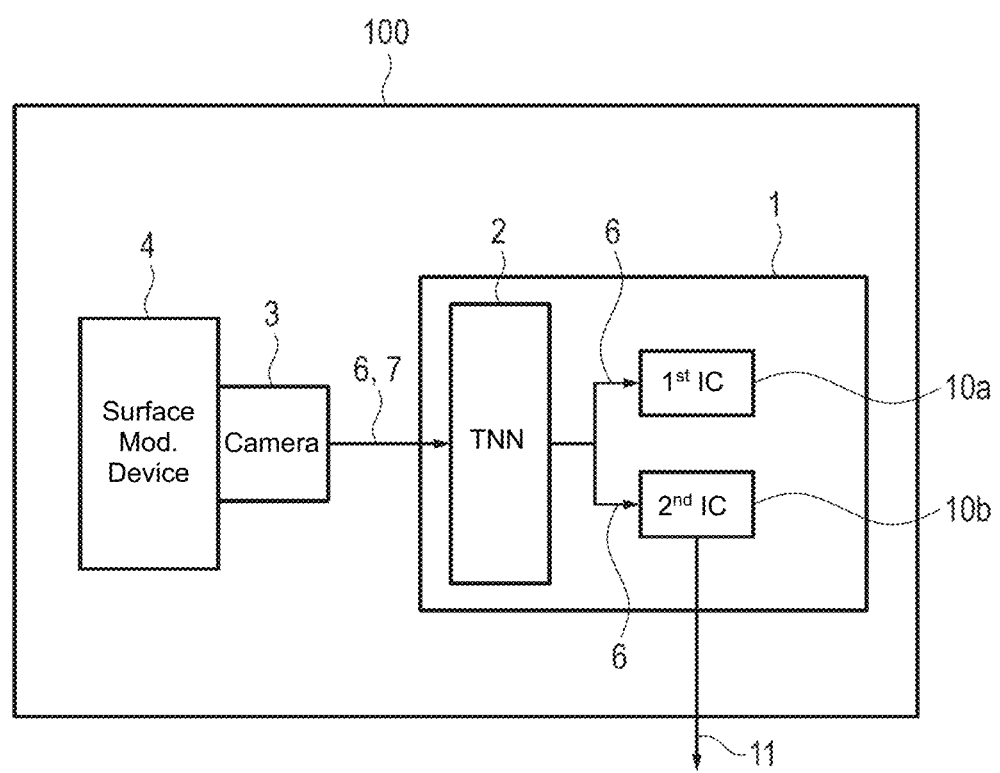
FIG. 2 shows a schematic representation of an apparatus, in one form, according to the teachings of the present disclosure.

The method is carried out by means of the apparatus 100 schematically represented in FIG. 2. The apparatus 100 comprises a surface modification device 4, which in one form is a laser soldering device. The laser soldering device is configured to generate a laser beam and emit it in the direction of the surface region 8 to be treated. The surface region 8 is furthermore supplied with a solder, for example in the form of a soldering wire, which is melted by means of the laser beam and used to join the vehicle roof to a side part.

The apparatus 100 furthermore comprises a camera unit 3. In one form, the process observation system is an imaging processing monitoring system, such as SCeye® from the manufacturer Scansonic, is used as the camera unit 3. The camera unit 3 is configured as a coaxial camera and has a laser illumination device, the wavelength of the laser of the laser illumination device differing from the wavelength of the processing laser of the laser soldering device. In one form, a wavelength of about 850 nm was selected for the laser illumination device. The camera unit 3 is correspondingly sensitive for this wavelength. By the wavelength of about 850 nm, perturbing influences due to ambient light and other light sources are substantially avoided.

The camera unit 3 is arranged with respect to the laser soldering device in such a way that an image sequence 5 in the form of a video can be recorded through the processing laser beam. In other words, an image sequence 5 comprising a plurality of individual images 6 of the surface region 8 to be assessed is acquired. An image detail 9 is in this case selected in such a way that it extends from the end region of the soldering wire over the process zone to the solder connection that has just solidified. The camera unit 3 is moved simultaneously with the processing laser beam, so that the image detail 9 is correspondingly moved over the surface region 8 and the image details 9 of the individual images 6 overlap at least partially. To this end, the frame rate of the camera unit 3 and the speed with which the processing laser and the camera unit 3 are moved are correspondingly matched to one another. For example, the frame rate for typical processing speeds may be 100 frames per second.

As already mentioned, the camera unit 3 is adapted and configured to record an image sequence 5 comprising a plurality of consecutive individual images 6 of the surface region 8 to be assessed. This image sequence 5 is transferred to a data processing unit (i.e., a data processor) 1 of the apparatus 100. The camera unit 3 and the data processing unit 1 are therefore in a signal-technological active connection.

The data processing unit 1 is used to process the individual images 6 of the image sequence 5. To this end, the data processing unit 1 comprises a trained neural network (TNN) 2, with the aid of which the individual images 6 are assigned to two image classes 10a, 10b. In this case, individual images 6 identified as "ok" are assigned to the first image class 10a (i.e., "$1^{st}$ IC" in FIG. 2) and individual images 6 identified as "defective" are assigned to the defective image class 10b (i.e., "$2^{nd}$ IC" in FIG. 2).

In one form, the trained neural network 2 is a neural network that has been trained by means of transfer learning. The trained neural network 2 is based on the pretrained neural network with the designation "ResNet50", which has already been described in the introduction. This pretrained neural network was trained further with 40 image sequences 5 recorded during laser-beam soldering, the image sequences 5 containing in total 400 individual images 6, for which the assignment to the image classes 10a, 10b was established. By this further training process, a trained neural network 2 was provided which is capable of identifying surface defects, for example pores, holes, splatters, but also equipment defects, for example a defective protective glass of the soldering optics, on individual images 6.

The data processing unit 1 is furthermore configured and adapted to check whether a plurality of individual images 6 of a predeterminable number of directly consecutive individual images 6 in the image sequence 5 have been assigned to the defective image class 10b. In one form, a check is made as to whether, out of four directly consecutive individual images 6 in the image sequence 5, all four individual images 6 have been assigned to the defective image class 10b. Depending on the accuracy desired, this stipulation may be varied. If four out of four directly consecutive individual images 6 have been assigned to the defective image class 10b, a defect signal 11 is output. With the apparatus 100 described above, for example, the method explained below with reference to FIG. 1 may be carried out.

With the method, defects that occur while carrying out the laser soldering method are determined in a computer-implemented fashion, in which case both surface defects and equipment defects may be identified. After the start of the method, in method step S1 an image sequence 5 having a plurality of individual images 6 of the surface region 8 to be assessed is recorded. In this case, the recording is carried out with a frame rate of 100 frames per second. Different frame rates are possible. The image detail 9 of each individual image 6 is selected in such a way that the image details 9 of the individual images 6 overlap partially. For example, an overlap of 80% may be provided, i.e., the image detail 9 is 80% identical in two directly consecutive individual images 6. During the recording of the image sequence 5, the image detail 9, or the camera unit 3 imaging the image detail 9, is moved together with the surface modification device 4.

In method step S2, the image sequence 5 is provided for further processing, for example transferred from the camera unit 3 to the data processing unit 1. In parallel therewith, in method step S3 the trained neural network 2 is provided.

In method step S4, the individual images 6 of the image sequence 5 are assigned to the two image classes 10a, 10b by means of the trained neural network 2, i.e., a decision is made as to whether or not the individual image 6 to be assigned exhibits a defect. In the former case, the assignment is carried out to the defective image class 10b, otherwise to the other image class 10a.

In the subsequent method step S5, a check is made as to whether a plurality of individual images (i.e., a set of individual images) of a predeterminable number of directly consecutive individual images 6 in the image sequence 5 have been assigned to the defective image class 10b. As already mentioned, in one form a check is made as to whether, out of four directly consecutive individual images 6 in the image sequence 5, all four individual images 6 have been assigned to the defective image class 10b.

If this is the case, the method continues to method step S6, in which a defect signal 11 is output. The method is therefore ended. If no four directly consecutive individual images 6 have been assigned to the defective image class 10b, the method returns to method step S1.

Of course, differences from this form of method are possible. For instance, provision may be made that the method is not ended with the output of the defect signal in method step S6, but instead the method returns to method step S1. Moreover, in one form, the method is carried out in real time during the laser soldering method, the individual method steps correspondingly overlapping in time. That is to say, further individual images 5 are recorded while the individual images 5 just recorded are being assigned to the image classes 10a, 10b, etc.

By the assessment of the surface region 8 not only being carried out with the aid of an individual image 6, but rather consecutive individual images 6 being used as temporal data, it is possible to observe whether a supposed or actual defect 7 "propagates through the camera image". Only if this is the case, that is to say the defect 7 can be detected on a plurality of individual images 6, is an actual defect 7 assumed. In this way, the reliability of the defect prediction may be improved significantly in comparison with conventional automated quality assurance, since fewer false-positive and false-negative defects 7 are determined. In comparison with visual inspection, besides reduced personnel outlay and cost savings in this regard, the proposed method has the advantage that even small defects 7, which cannot be identified with the naked eye, can be determined. The quality of the surface-treated components may therefore be improved overall, since components with low quality may be rejected or method parameters and/or apparatus parts may be modified in such a way that the defects 7 determined no longer occur.

Figure 3:
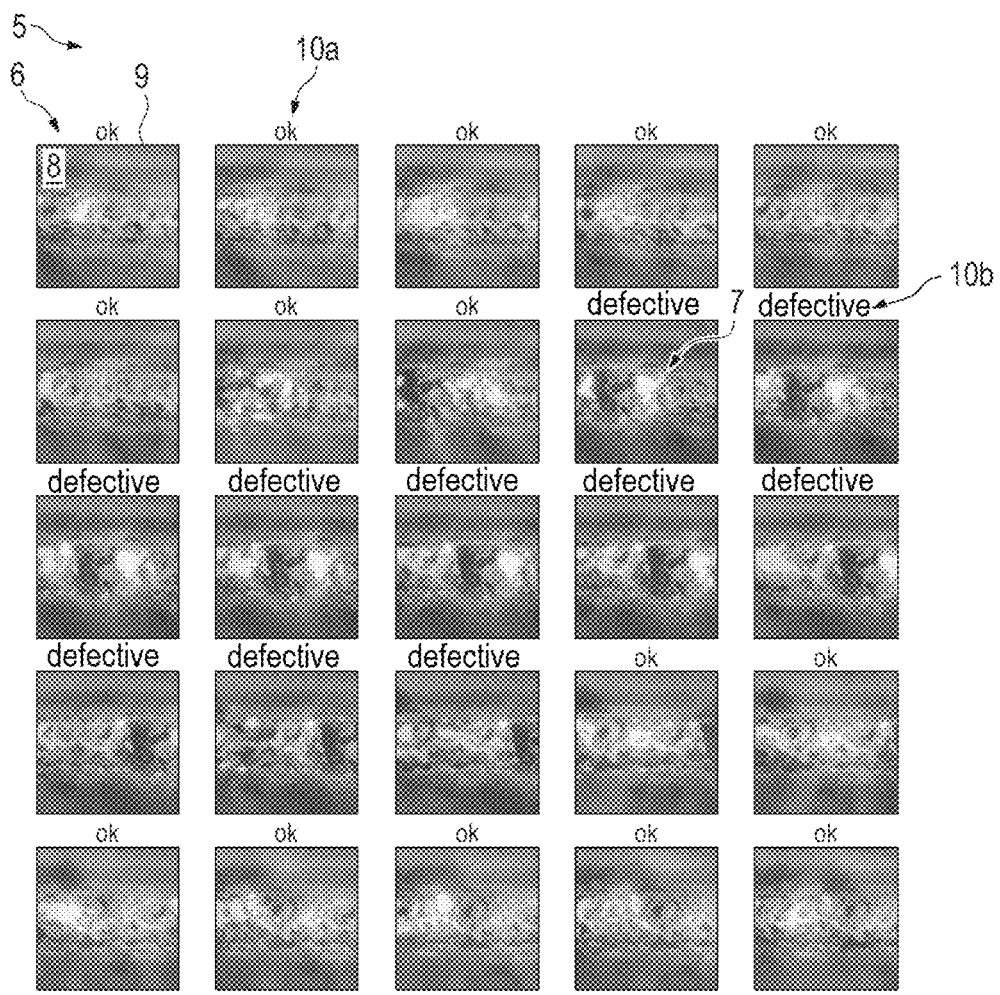
FIG. 3 shows a form of an image sequence, according to the teachings of the present disclosure.

FIG. 3 shows one form of an image sequence 5 of a surface region 8 to be assessed of a component whose surface is treated by means of a laser soldering method. The image sequence 5 comprises 25 individual images 6, the image details 9 of which overlap partially. The individual images 6 were recorded in the order from top left to bottom right by the camera unit 3 and transmitted to the data processing unit 1 of the apparatus 100 for evaluation.

By means of the trained neural network 2 of the data processing unit 1, the individual images 6 have respectively been assigned to an image class 10a, 10b, as may be seen in FIG. 3 with the aid of the classification as "ok" or "defective". In this case, the first eight individual images 6 were classified as "ok" and consequently assigned to the first image class 10a. This is followed by twelve individual images 6 that were classified as "defective" and consequently assigned to the defective image class 10b. Subsequently, there are seven individual images 6 that were again classified as "ok" and assigned to the image class 10a.

In the individual images 6 assigned to the defective image class 10b, a pore may be seen as a defect 7. This defect 7 propagates through the movement of the camera unit 3 together with the surface modification device 4 in the image detail 6 from left to right.

In order to be able to detect the defect 7 reliably with high probability, for example a check is made as to whether four directly consecutive individual images 6 have been assigned to the defective image class 10b. This is the case with the image sequence shown in FIG. 3, since in total 12 directly consecutive individual images 6 have been assigned to the defective image class 10b. An actual presence of a defect 7 may therefore be assumed with a very high probability, and a defect signal 11 is output. The defect signal 11 may for example cause an interruption of the surface modification method, in order to be able to remove the faulty component from the production process. As an alternative, the production process may also continue to run and after the completion of its surface modification the relevant component is removed or visually examined for further inspection.

Figure 4:
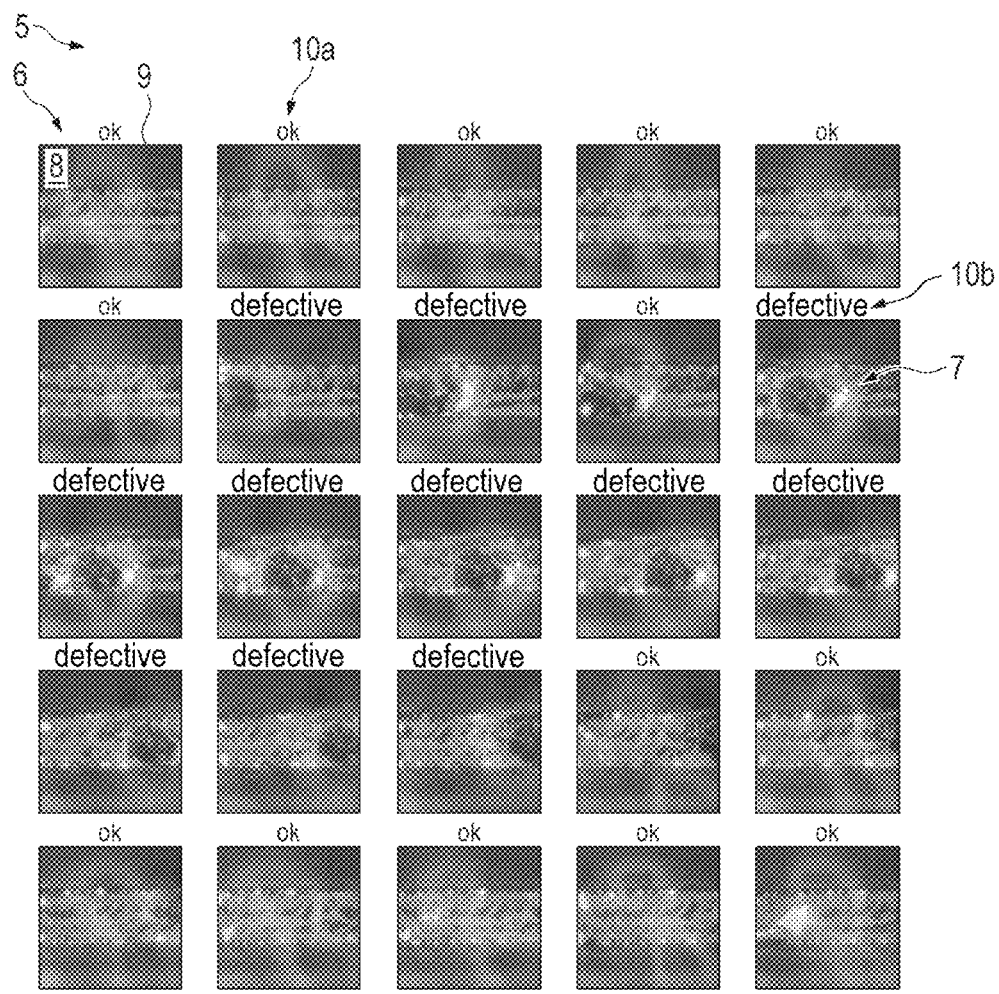
FIG. 4 shows another form of an image sequence, according to the teachings of the present disclosure.

FIG. 4 shows a further form of the image sequence 5 of a surface region 8 to be assessed of a component whose surface is treated by means of a laser soldering method. The image sequence 5 again comprises 25 individual images 6, the image details 9 of which overlap partially. The individual images 6 were, as in FIG. 3, recorded in the order from top left to bottom right by the camera unit 3 and transmitted to the data processing unit 1 of the apparatus 100 for evaluation.

By means of the trained neural network 2 of the data processing unit 1, the individual images 6 have respectively been assigned to an image class 10a, 10b, as may be seen in FIG. 4 with the aid of the classification as "ok" or "defective". In this case, the first six individual images 6 were classified as "ok" and consequently assigned to the first image class 10a, two individual images 6, which were classified as "defective", one individual image 6 which was classified as "ok", nine individual images 6 which were classified as "defective" and a further seven individual images 6 which were classified as "ok". In other words, with the exception of one single individual image 6, twelve directly consecutive individual images 6 were assigned to the defective image class 10b.

In the individual images 6 assigned to the defective image class 10b, a pore may be seen as a defect 7. This defect 7 propagates through the movement of the camera unit 3 together with the surface modification device 4 in the image detail 6 from left to right.

In order to be able to detect the defect 7 reliably with high probability, for example a check is made as to whether four directly consecutive individual images 6 have been assigned to the defective image class 10b. This is the case with the image sequence 5 shown in FIG. 4, since in total 9 directly consecutive individual images 6, i.e., the $10^{th}$ to $18^{th}$ individual images 6, were assigned to the defective image class 10b. An actual presence of a defect 7 may therefore be assumed with a very high probability, and a defect signal 11 is output.

Figure 5:
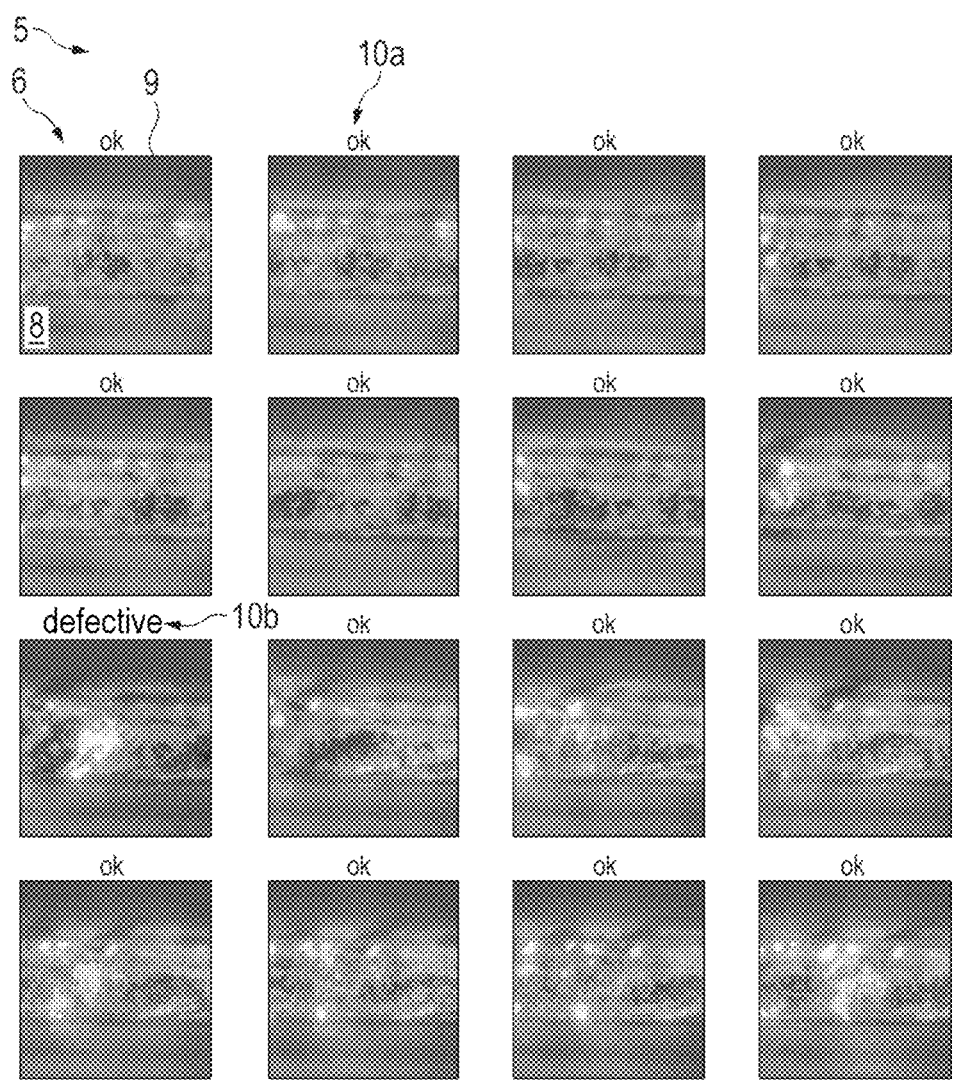
FIG. 5 shows yet another form of an image sequence, according to the teachings of the present disclosure.

FIG. 5 shows a further form of the image sequence 5 of a surface region 8 to be assessed of a component whose surface is treated by means of a laser soldering method. The image sequence 5 comprises 20 individual images 6, the image details 9 of which overlap partially. The individual images 6 were, as in FIG. 3, recorded in the order from top left to bottom right by the camera unit 3 and transmitted to the data processing unit 1 of the apparatus 100 for evaluation.

By means of the trained neural network 2 of the data processing unit 1, the individual images 6 have respectively been assigned to an image class 10a, 10b, as may be seen in FIG. 5 with the aid of the classification as "ok" or "defective". In this case, the first eight individual images 6 were classified as "ok" and consequently assigned to the first image class 10a. The ninth individual image 6 was classified as "defective". The further individual images were again classified as "ok".

However, the individual image 6 classified as "defective" is a false classification since this individual image 6 does not in fact exhibit a defect 7. If each individual image 6 were then only used independently of the further individual images 6 for the defect prediction, this falsely classified individual image 6 would already trigger the output of a defect signal 11 and possibly stop the component production.

Yet since according to the proposed method provision is made to check whether a plurality of individual images 6 of a predeterminable number of directly consecutive individual images 6 in the image sequence 5 have been assigned to the defective image class 10b, no defect signal 11 is output when applying the proposed method since only one single individual image 6 has been assigned to the defective image class 10b. The detection of false-positive defects 7 can therefore be avoided.

Figure 6:
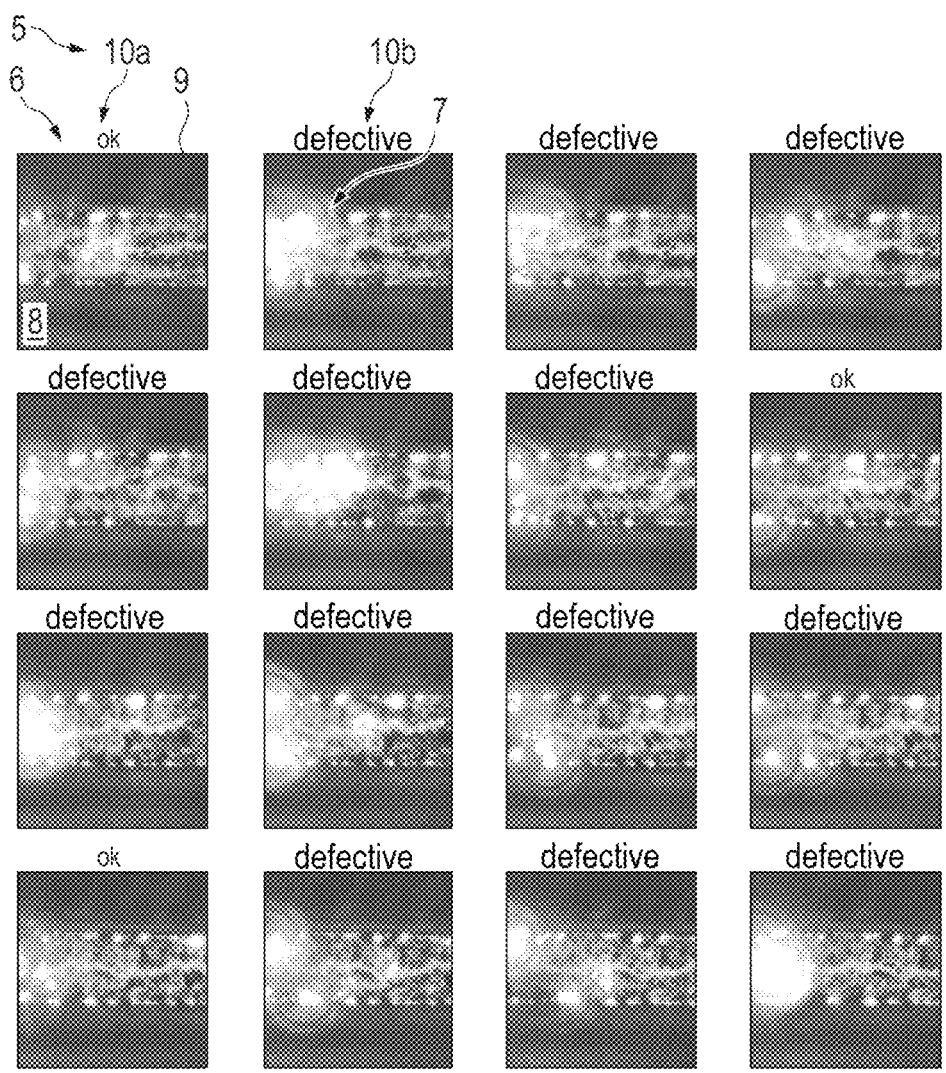
FIG. 6 shows a further form of an image sequence, according to the teachings of the present disclosure.

FIG. 6 shows a further form of an image sequence 5 of a surface region 8 to be assessed of a component whose surface is treated by means of a laser soldering method. The image sequence 5 again comprises 20 individual images 6, the image details 9 of which overlap partially. The individual images 6 were, as in FIG. 3, recorded in the order from top left to bottom right by the camera unit 3 and transmitted to the data processing unit 1 of the apparatus 100 for evaluation.

By means of the trained neural network 2 of the data processing unit 1, the individual images 6 have respectively been assigned to an image class 10a, 10b, as may be seen in FIG. 6 with the aid of the classification as "ok" or "defective". In this case, the first individual image 6 was classified as "ok" and consequently assigned to the first image class 10a. All subsequent individual images 6 were classified as "defective" and assigned to the defective image class 10b.

In the individual images 6 assigned to the defective image class 10b, damage to the protective glass may be seen as a defect 7. This defect 7 propagates through the movement of the camera unit 3 together with the surface modification device 4 in the image detail 9 from left to right.

In order to be able to detect the defect 7 reliably with high probability, for example a check is made as to whether four directly consecutive individual images 6 have been assigned to the defective image class 10b. This is the case with the image sequence 5 shown in FIG. 6, since in total 19 directly consecutive individual images 6 have been assigned to the defective image class 10b. An actual presence of a defect 7 may therefore be assumed with a very high probability, and a defect signal 11 is output. The proposed method is thus also suitable for the detection of defects 7 of the surface modification device 4.

Because of the significantly different appearance of the defect 7 in the image sequence 5 of FIG. 6 (glass defect) than the defects 7 (pores) shown in FIGS. 3 and 4, discrimination of the defect type may also be carried out.

FIG. 7 shows a representation of the prediction accuracy of defects 7 by means of the method described above in comparison with visual examination, as has hitherto been customary. The surface region 8 of 201 components was analyzed, i.e., 201 components were surface-treated by means of a laser soldering method.

From the representation, it may be seen that 100% of the components identified as "defective" by means of visual examination were also identified as "defective" by means of the proposed method (category "true positive"). None of the components identified as "ok" by means of visual examination was identified as "defective" by means of the proposed method (category "false positive"). Likewise, none of the components identified as "defective" by means of visual examination was identified as "ok" by means of the proposed method (category "false negative"). Again, 100% of the components identified as "ok" by means of visual examination were also identified as "ok" by means of the proposed method (category "true negative"), the asterisk "*" in FIG. 5 indicating that an actual defect 7 was identified correctly by means of the proposed method but not in the scope of the conventional manual visual examination. The defect 7 was so small that it was no longer visible after the downstream grinding process of the surface. A subsequent manual analysis of the process video showed that the defect 7 was actually a very small pore.

Only by further studies was it possible to confirm the existence of the defect 7. It may consequently be concluded that, by means of the proposed method, the accuracy of the assessment of the surface quality of the previously conventional visual examination may be not only achieved but even surpassed, i.e., even defects 7 that cannot be identified by means of conventional visual examination are identified.

In summary, the disclosure offers the following main advantages:

Even very small defects 7 can be identified, so that visual examination of the surface region 8 of the component after carrying out the surface modification method is superfluous. Besides such surface defects, equipment defects may also be identified. Servicing and maintenance measures may be instigated in good time. The defect identification may be carried out in real time, i.e., downstream quality control may be superfluous. The prediction accuracy is significantly better in comparison with previous methods, i.e., there are fewer false-positive or false-negative results.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for determining defects during a surface modification method of a surface region of a component, the method comprising:
   providing an image sequence of a surface region to be assessed, wherein the image sequence comprises a plurality of individual images, each individual image shows an image detail of the surface region and one or more image details of the individual images overlap at least partially;
   assigning the individual images to at least two image classes, at least one image class among the at least two image classes is indicative of a defective image class;
   checking whether a set of individual images of a predeterminable number of directly consecutive individual images in the image sequence have been assigned to the defective image class;
   outputting a defect signal when the set of individual images of the predeterminable number of directly consecutive individual images have been assigned to the defective image class; and
   causing an interruption of the surface modification method that results in the component being removed from a production process associated with the surface modification method, and wherein the interruption of the surface modification method is based on the output of the defect signal.

2. The method according to claim 1, comprising:
   providing a trained neural network,
   wherein an assignment of the individual images to the image classes being carried out by the trained neural network.

3. The method according to claim 2, wherein the trained neural network is trained by transfer learning.

4. The method according to claim 2, wherein the trained neural network is trained by iterative learning.

5. The method according to claim 1 further comprising recording the image sequence.

6. The method according to claim 5, wherein the image sequence is acquired with a frame rate of at least 100 frames per second.

7. The method according to claim 1, wherein the surface modification method is at least one of a soldering method, a laser-beam hard soldering method, a welding method, an adhesive bonding method, a coating method, or a 3D printing method.

8. The method according to claim 1, wherein the image detail is moved together with a surface modification device for carrying out the surface modification method.

9. The method according to claim 1, wherein the method is carried out in real time while carrying out the surface modification method.

10. The method according to claim 1 further comprising determining surface defects in the surface region of the component, equipment defects of a surface modification device for carrying out the surface modification method, or combination thereof.

11. The method of claim 1, wherein the individual images are assigned to the at least two image classes by a trained neural network.

12. The method of claim 11, wherein the trained neural network is trained by transfer learning or iterative learning.

13. An apparatus for determining defects that occur during a surface modification method of a surface region of a component, the apparatus comprising:
   a data processor configured to:
      assign a plurality of individual images of an image sequence of a surface region to be assessed to at least two image classes, each individual image showing an image detail of the surface region and the image details of the individual images overlapping at least partially, and at least one image class among the at least two image classes is indicative of a defective image class;
      check whether a set of individual images of a predeterminable number of directly consecutive individual images among the plurality of individual images of the image sequence have been assigned to the defective image class;
      output a defect signal in response to the set of individual images of the predeterminable number of directly consecutive individual images being assigned to the defective image class; and
      cause an interruption of the surface modification method that results in the component being removed from a production process associated with the surface modification method, and wherein the interruption of the surface modification method is based on the output of the defect signal.

14. The apparatus according to claim 13, wherein the data processor comprises a trained neural network for assigning the individual images to the at least two image classes.

15. The apparatus according to claim 14, wherein the trained neural network is trained by transfer learning.

16. The apparatus according to claim 14, wherein the trained neural network is trained by iterative learning.

17. The apparatus according to claim 13 further comprising a camera configured to record the image sequence having the plurality of individual images.

18. The apparatus according to claim 17, wherein the camera is configured to record the image sequence with a frame rate of at least 100 frames per second.

19. The apparatus according to claim 13 further comprising:
   a surface modification device configured to perform the surface modification method on the surface region of the component.

20. A non-transitory computer-readable medium storing a computer program for determining defects that occur during a surface modification method of a surface region of a component, the computer program including instructions that, when executed by a processor, causes the processor to:
   assign a plurality of individual images of an image sequence of a surface region to be assessed to at least two image classes, wherein each individual image among the plurality of individual images shows an image detail of the surface region and the image details of the individual images overlap at least partially and at least one image class among the at least two image classes is indicative of a defective image class;
   check whether a set of individual images of a predeterminable number of directly consecutive individual images in the image sequence have been assigned to the defective image class;
   outputting a defect signal when the set of individual images of the predeterminable number of directly consecutive individual images have been assigned to the defective image class; and
   causing an interruption of the surface modification method that results in the component being removed from a production process associated with the surface modification method, and wherein the interruption of the surface modification method is based on the output of the defect signal.

* * * * *